(12) United States Patent
Burns

(10) Patent No.: US 6,483,610 B1
(45) Date of Patent: Nov. 19, 2002

(54) MOUNTING SYSTEM FOR TWO-DIMENSIONAL SCANNER

(75) Inventor: Roland John Burns, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/391,920

(22) Filed: Sep. 9, 1999

(51) Int. Cl.[7] ............................................... H04N 1/40
(52) U.S. Cl. .............. 358/474; 348/333.01; 348/333.06
(58) Field of Search ................................. 358/474, 471, 358/400, 473, 468; 348/496, 63, 211, 477, 333.01, 136, 333.06

(56) References Cited

U.S. PATENT DOCUMENTS

| | | | |
|---|---|---|---|
| 5,227,896 A | 7/1993 | Ozawa et al. | 358/474 |
| 5,515,181 A | 5/1996 | Iyoda et al. | 358/474 |
| 5,528,290 A | 6/1996 | Saund | 348/218 |
| 6,064,426 A * | 5/2000 | Waterman | 348/63 |
| 6,067,112 A * | 5/2000 | Wellner et al. | 348/211 |
| 6,307,649 B1 * | 10/2001 | Williamson | 358/474 |

* cited by examiner

Primary Examiner—Cheukfan Lee

(57) ABSTRACT

A mounting system for a two-dimensional scanner may comprise a base and a platen mounted to the base. A multi-axis scanner support apparatus mounted to the base is sized to receive the two-dimensional scanner. The multi-axis scanner support apparatus allows the two-dimensional scanner to be moved between a first position wherein the two-dimensional scanner receives image light from an object positioned on the platen and a second position wherein the two-dimensional scanner receives image light from an object not positioned on the platen.

19 Claims, 5 Drawing Sheets

MOUNTING SYSTEM FOR TWO-DIMENSIONAL SCANNER

FIELD OF INVENTION

This invention relates to optical scanners in general and more specifically to a mounting system for a two-dimensional scanner to allow the scanner to be used in a multiplicity of applications.

BACKGROUND

Two-dimensional digital scanners, or cameras, as they have come to be known, are well-known in the art and are analogous to ordinary film-type cameras, except that the film is replaced with an electronic photosensor (e.g., a two-dimensional CCD array). The electronic photosensor array converts the light received by the camera into electronic signals which may be digitized, processed, and/or stored as digital image data. Such two-dimensional digital scanners or cameras may be operated as a conventional single frame or "still" camera, in which the digital scanner produces digital image data corresponding to a single frame or picture. Alternatively, such cameras may be operated in a manner akin to a video camera, producing several tens of picture frames per second (e.g., 30 frames per second) to record moving objects.

Regardless of the particular manner in which they are used, such two-dimensional digital scanners or cameras offer considerable advantages over conventional film-type cameras (i.e., either still cameras or motion picture cameras) in that the digital image data produced thereby may be stored, processed, and/or reproduced with ease. The relative ease of handling and processing the digital image data produced by the digital cameras allows user to readily enlarge, reduce, or otherwise modify the digital image data to create any of a wide range of photographic effects and styles.

One common use of a digital camera of the type described above mounts the camera adjacent a display device, such as a CRT, and operates the digital camera in a video mode to accomplish video conferencing. The video signal generated by the digital camera is transmitted via telephone lines or some other convenient communication link to produce a picture of the subject on a corresponding display device at a remote location. Two or more such camera/display units may be utilized allowing persons at remote locations to carry on a face-to-face discussion.

During such video conferencing events it is often desired by one or more participants in the conference to transmit to the other conference participants one or more still picture photos of objects or persons which may be need to be discussed during the video conference. While a separate digital camera may be used for such purposes, the user usually has to perform several steps or procedures in order to first capture the image and then to transfer the digital image data over the communication link to the other conference participants. For example, the user may first have to take a picture or snap-shot of the desired object, remove from the camera a diskette containing the digital snap-shot image data, load the diskette into a computer, and finally transfer the data file to the other conference participants. Alternatively, the digital image data captured by the camera may be transferred directly from the camera to the computer by means of a conventional serial or parallel data transfer cable.

In still other situations it may be necessary or desirable for the conference participants to transmit text or graphics contained on paper documents. While such information may usually be converted into digital image data suitable for transmission by any of a wide variety of electronic scanners (e.g., flatbed or hand-held scanners), it is usually necessary for the user to also have such a scanner handy during the video conference so that such information may be scanned and transmitted to the other conference participants. Of course, before these processes can be accomplished the user must also generally perform a series of steps or operations in order to scan the desired document or object and then transfer the resulting scanned image data to the other conference participants.

As can be appreciated from the foregoing discussion, modern video conferencing events may require the use of several different types of cameras and scanner apparatus in order to communicate the required data to the conference participants. For example, a video camera may be needed to produce a real time video image of the participant, whereas a separate still or snap-shot type of digital camera may need to be handy in case it is required or desired to transmit single frame images of objects or persons. In still other situations, it may be advantageous to have a document scanner at the ready so that any required documents, drawings, or photographs may be transmitted to the other participants. While the foregoing arrangement may be effective from a functional standpoint, it requires several different types of components and devices, many of which are relatively expensive, to perform similar types of imaging tasks. Moreover, such a multiplicity of devices tend to occupy a significant amount of desk space, which is almost always in short supply.

SUMMARY OF THE INVENTION

A mounting system for a two-dimensional scanner may comprise a base and a platen mounted to the base. A multi-axis scanner support apparatus mounted to the base is sized to receive the two-dimensional scanner. The multi-axis scanner support apparatus allows the two-dimensional scanner to be moved between a first position wherein the two-dimensional scanner receives image light from an object positioned on the platen and a second position wherein the two-dimensional scanner receives image light from an object not positioned on the platen.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
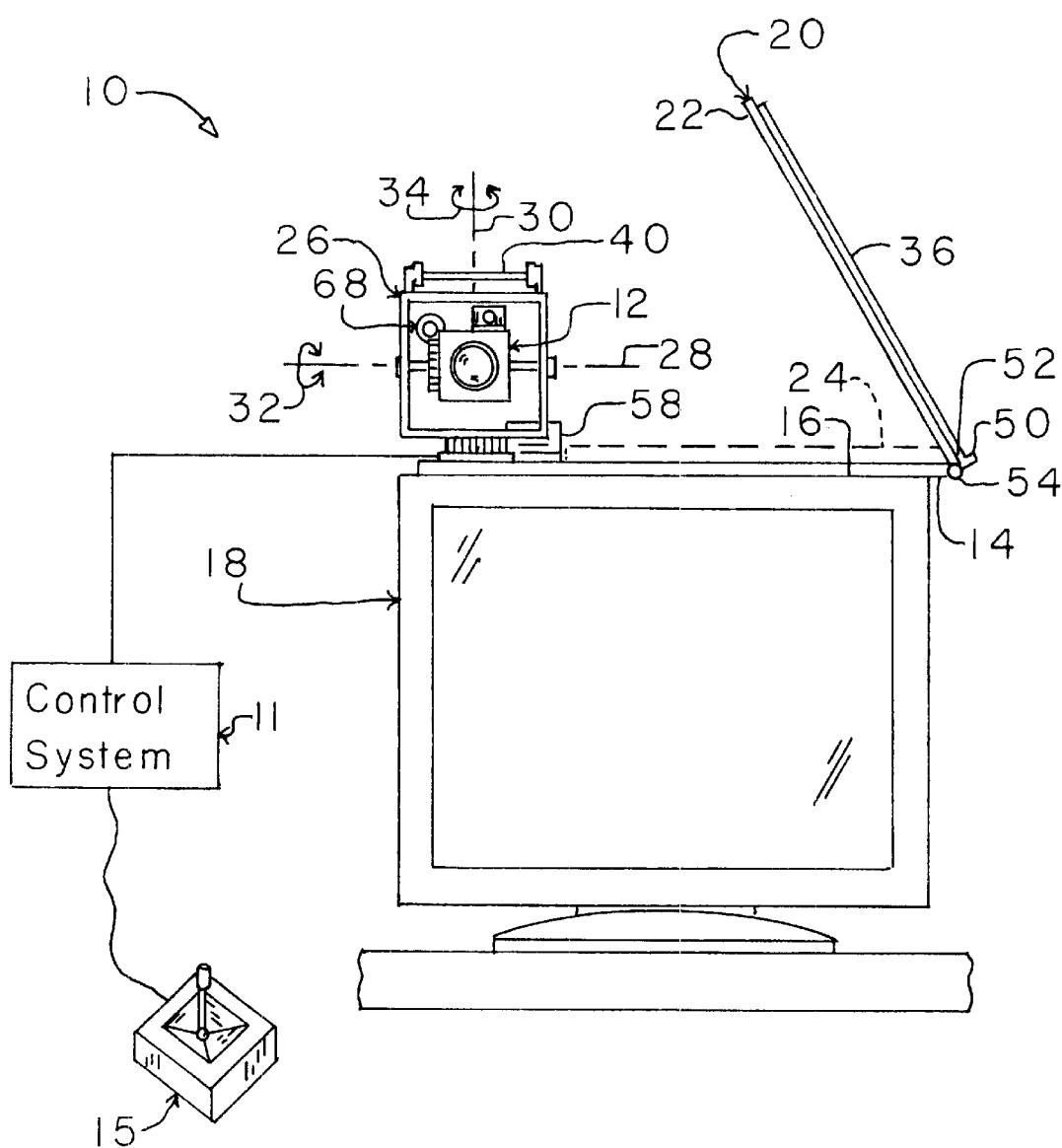
FIG. 1 is a front view in elevation of the mounting system according to the present invention as it could be used in conjunction with a CRT type display device with the two-dimensional scanner in the video conference position.
Figure 2:
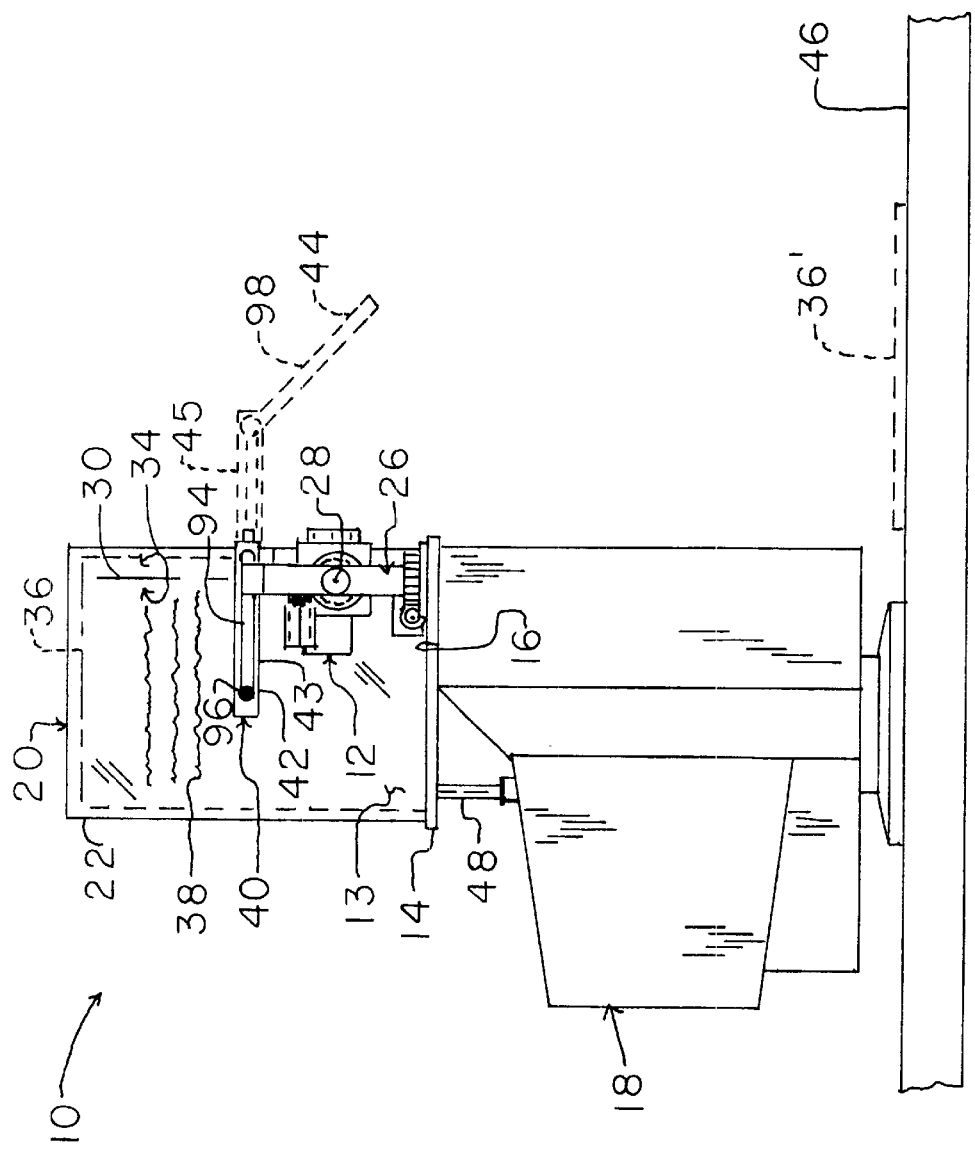
FIG. 2 is a side view in elevation of the mounting system shown in FIG. 1.

A Mounting system 10 for a two-dimensional scanner 12 is best seen in FIGS. 1 and 2 and may comprise a base 14 that is sized to be mounted to a top surface 16 of a display device 18, such as a CRT. A platen 20 may be pivotally mounted to the base 14 so that the platen 20 may be moved or folded between an extended position 22 and a retracted or stowed position 24. In one preferred embodiment, the platen 20 may comprise a transparent member and may be used to support a document 36, such a sheet of paper with written text or graphics 38 (FIG. 2) provided thereon so that an image of the same may be captured by the two-dimensional scanner 12. The mounting system 10 may also be provided with a multi-axis scanner support apparatus 26 that is sized to receive the two-dimensional scanner 12. In the embodiment shown and described herein, the multi-axis scanner support apparatus 26 is mounted to the base 14. Alternatively, other mounting arrangements may be utilized as will be described in greater detail below. The multi-axis scanner support apparatus 26 allows the two-dimensional scanner 12 to be tilted and panned about respective tilt and pan axes 28 and 30 in the directions indicated by arrows 32 and 34.

The mounting system 10 according to the present invention allows the two-dimensional scanner 12 to be used in a multiplicity of applications or modes. For example, the two-dimensional scanner 12 may be operated in a video conference mode by operating the mounting system 10 to pan and tilt the two-dimensional scanner 12 so that it is substantially in the position illustrated in FIGS. 1 and 2. When so positioned, the two-dimensional scanner 12 may be used to capture and transmit a video image of a user or participant (not shown) seated in front of the display device 18. In an alternative application, the two-dimensional scanner 12 may be operated as a conventional single frame or snap-shot camera in which the scanner 12 is used to take a snap-shot of a person or object. As will be described in greater detail below, the scanner 12 may be used to take such a snap-shot by aiming the scanner 12 at the desired object. The resulting digital image or "frame" data may then be downloaded into a host computer system (not shown) for processing, storage, and/or transmission to other locations or systems, as the case may be.

The mounting system 10 may also be used to allow the two-dimensional scanner 12 to be operated in a document scan mode. When operated in the document scan mode, the two-dimensional scanner 12 captures and produces two-dimensional scanned image data that are representative of an object or document being scanned. While operation of the scanner 12 in the document scan mode is similar to the operation of the scanner 12 in the snap-shot or still camera mode, the resolution is generally considerably higher in the document scan mode. Such increased resolution allows fine detail on the document to be captured and discerned in the resulting scanned image data. In the embodiment shown and described herein, the two-dimensional scanner 12 may be operated in the document scan mode by first panning and tilting the two-dimensional scanner 12 so that it is substantially in the position illustrated in FIG. 3. The scanner 12 may then be operated to scan a document 36 positioned on the transparent platen 20. The electronic image data (not shown) resulting from the document scan operation may then be processed or transmitted in a conventional manner.

It is generally preferred, but not required, to also provide the mounting system 10 with a mirror assembly 40 to allow the two-dimensional scanner 12 to be operated in a second document scan mode. For example, when the mirror assembly 40 is moved from a retracted position 42 (FIG. 1) to an extended position 44 (shown in dotted lines in FIG. 2), the mirror assembly 40 allows the two-dimensional scanner to detect image light (not shown) reflected by an object or document 36' positioned on a horizontal surface 46 immediately in front of the display device 18. The mirror assembly 40 therefore allows the two-dimensional scanner 12 to be used to scan an object that is positioned on the horizontal surface 46 instead of on the transparent platen 20. The ability to operate the scanner 12 in this second document scan mode may be advantageous if the item or document to be scanned is too heavy or large to fit conveniently on the transparent platen assembly 20.

A significant advantage associated with the mounting system 10 according to the present invention is that it allows the two-dimensional scanner 12 to be operated in a multiplicity of applications or modes, thereby dispensing with the need to utilize a separate video camera, still camera, and document scanner to perform various imaging functions. For example, when the scanner 12 is oriented substantially as shown in FIGS. 1 and 2, the scanner 12 may be operated in a video conference mode in which the two-dimensional scanner 12 is operated to produce a video signal of a person or an object (not shown) seated in front of the display device 18. So oriented, the mounting system 10 allows the two-dimensional scanner 12 to produce a more natural video conference in which a video image of the person (not shown) seated in front of the display 18 is taken "head on," i.e., the resulting video conference is more akin to a face-to-face meeting.

If, for some reason, the need arises during the video conference for the participants to closely examine an object or device, a conference participant utilizing the mounting system 10 according to the present invention could readily prepare and transmit an image of the object or device by first moving or "steering" the scanner 12 so that the object or device is "framed" within the field of view of the camera. That is, the user first composes the picture. Once properly composed, the user could then capture a single frame image or snap shot of the device by actuating a shutter release (not shown) operatively associated with the scanner 12. For example, the shutter release may be provided by the host computer (not shown) as a suitable icon on the display device 18. The shutter release icon may then be selected in a conventional manner (e.g., by the click of a mouse). The scanner 12 could be operated in the still picture mode at any time, i.e., regardless of whether the user is currently participating in a video conference.

The mounting system 10 may also allow the scanner 12 to be operated as a document scanner to allow the user to capture and transmit scanned image data representative of written text or graphics 38 (FIG. 2) provided on a document 36. In the embodiment shown and described herein, such a document 36 may be scanned by placing the document 36 on the transparent platen 20. The user would then operate the mounting system 10 as necessary to pan and tilt the two-dimensional scanner to the position illustrated in FIG. 3. Thereafter, the two-dimensional scanner 12 could be commanded to scan the document 36. The resulting scanned image data may then be transferred to the other video conference participants for review and inspection. Of course, the scanner 12 could be operated in such a document scan mode at any time, i.e., regardless of whether the scanner 12 is also being used in the video conference mode.

Still other advantages are associated with the mirror assembly 40. For example, in the embodiment shown and described herein, the mirror assembly 40 allows the two-dimensional scanner 12 to receive image light (not shown) from a document or object 36' positioned on the horizontal surface 46 in front of the display device 18. The mirror assembly 40 therefore allows the scanner 12 to be used to electronically scan objects or documents 36' which may be too large or heavy to be conveniently placed on the transparent platen 20.

Yet another advantage associated with the mounting system 10 is that it is portable and may be readily transferred from among various display devices and work stations, thereby allowing a single mounting system 10 to serve many users.

Having briefly described one embodiment of the mounting system 10, as well as some of its more significant features and advantages, the various embodiments of the mounting system according to the present invention will now be described in detail. However, before proceeding with the description it should be noted that while the various embodiments of the mounting system 10 are shown and described herein as they could be used in conjunction with a conventional CRT display device of the type commonly associated with "desk top" computers, the mounting system 10 is not limited to use with any particular type of display device 18 having any particular style or configuration. The mounting system 10 is also shown and described herein as it could be used with a particular type of two-dimensional scanner 12 that is well-known in the art and readily commercially available. However, the mounting system 10 is not limited to use with this particular type of scanner and could instead be used to mount a wide variety of other types of scanners now known or that may be developed in the future, as would be obvious to persons having ordinary skill in the art after having become familiar with the teachings of the present invention. Consequently, the present invention should not be regarded as limited to use with the particular types of components and devices shown and described herein.

It should also be noted that since two-dimensional scanners of the type that may be utilized in the present invention are well-known in the art, the following description will not include an extensive discussion of structural elements and modes of operation of the two-dimensional scanner 12. Similarly, the various ancillary devices (e.g., scanner control systems and image data processing systems) and image data processing methods that may be associated with such two-dimensional cameras are also well-known in the art and could be easily provided by persons having ordinary skill in the art after having become familiar with the teachings of the present invention. Accordingly, the following description also will not include an extensive discussion of the various ancillary devices and image data processing methods that may be utilized with any particular two-dimensional scanner apparatus.

With the foregoing considerations in mind, one embodiment of the mounting system 10 according to the present invention may comprise a portion of a work station which may also be provided with a display device 18. The mounting system 10 may comprise a base 14 that is sized to mount on the top surface 16 of the display device 18, such as a CRT display, of the type commonly used in conjunction with desk-top computer systems or work stations. In the embodiment shown and described herein, the base 14 may comprise a generally rectangularly shaped member which may be provided with one or more support legs 48 (FIG. 2) to help support the rear portion of the base 14, particularly if the base member 14 is utilized on a display device 18 having a top surface 16 that declines toward the rear portion of the display device. In this regard it is generally preferred, but not required, that the base 14 comprise a "universal" design in which the base 14 may be configured to mount atop any of a wide variety of display devices having any of a wide variety of physical configurations. Alternatively, the base member 14 may comprise a "custom" design in which the base member 14 is configured to mount to the top surface 16 of a particular type or style of display device 18.

It is also generally preferred, but not required, that the base 14 be designed so that it may be readily attached to and detached from the display device 18. Such a readily detachable mounting configuration allows the mounting system 10 to be easily moved from among several different locations or work stations. Many different types of mounting systems that are now known or that may be developed in the future could be used to provide such a readily detachable feature. Consequently, the present invention should not be regarded as limited to any particular system or device for securing the base 14 to the display device 18. However, by way of example, the base 14 in one preferred embodiment is fastened to the top surface 16 of the display device 18 by fabric hook-and-loop type fasteners (e.g., Velcro) (not shown). Alternatively, the base member 14 could be more permanently attached to the display device 18, as would be obvious to persons having ordinary skill in the art after having become familiar with the teachings of the present invention.

The base 14 may be made from any of a wide range of materials, such as metals or plastics, suitable for the intended application. Accordingly, the present invention should not be regarded as limited to a base 14 fabricated from any particular type of material. By way of example, in one preferred embodiment, the base 14 is fabricated from a moldable thermo-plastic resin material of the type that is well-known in the art for such purposes and readily commercially available.

The mounting system 10 may be provided with a generally rectangular platen member 20 that is sized to receive and hold a document 36, such as letter or legal sized paper. The platen 20 may be provided with a document support flange 50 along the bottom or lower edge 52 of platen member 20 to help support the document 36 and prevent it from sliding off the platen 20. Alternatively, other types of devices known in the art, e.g., a paper bail (not shown) of the type commonly used with typewriters, may be used to hold the document 36 in place on the platen 20. Since the two-dimensional scanner 12 is positioned on the opposite side of the platen 20 as the document 36, the platen 20 should be provided with a transparent region 13 to allow image light (not shown) reflected by the document 36 to be received by the two-dimensional scanner 12. By way of example, the platen 20 in one preferred embodiment of the invention is molded as a single piece from a transparent acrylic plastic material. Alternatively, however, other types of transparent materials, such as glass, may also be used, as would be obvious to persons having ordinary skill in the art after having become familiar with the teachings of the present invention.

It is generally preferred, but not required, to mount the platen assembly 20 to the base 14 so that the platen 20 may be moved from the extended position 22 to a folded or retracted position 24 when not in use. In the embodiment shown and described herein, the platen 20 is mounted to the base 14 by means of a hinge assembly 54. Hinge assembly 54 allows the platen 20 to be pivoted between the extended position 22 and the folded or retracted position 24. Alternatively, other types of mounting arrangements may also be used.

As was briefly mentioned above, the multi-axis scanner support apparatus 26 may also be mounted to the base 14.

Such a mounting arrangement allows the base 14, the platen 20, and the multi-axis scanner support apparatus 26 to be attached to and removed from the display device 18 as a single unit. The multi-axis scanner support apparatus 26 allows the two-dimensional scanner 12 to be panned and tilted as necessary to receive image light (not shown) reflected by the object or document 36 positioned on the platen 20. The multi-axis scanner support apparatus 26 also allows the two-dimensional scanner 12 to receive image light (not shown) from objects that are not positioned on the platen 20. For example, the multi-axis scanner support apparatus 26 may be used to orient the scanner 12 so that it receives image light reflected by a person seated in front of the display device 18. The ability to pan and tilt the scanner 12 between two or more positions allows the scanner 12 to be more conveniently operated in the video conference mode, the still camera mode, or in either of the document scan modes.

Figure 4:
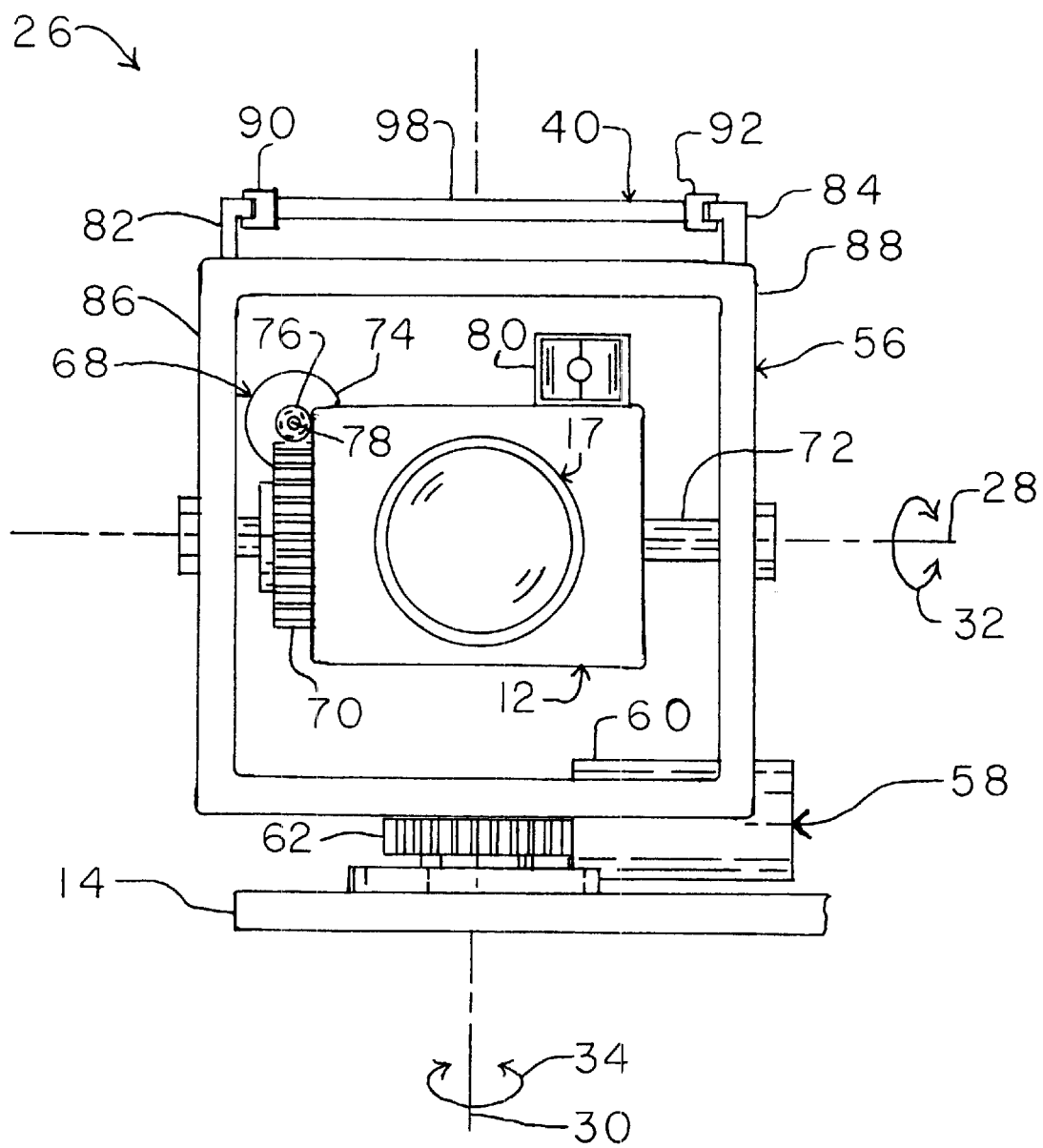
FIG. 4 is an enlarged front view in elevation of the multi-axis scanner support apparatus.
Figure 5:
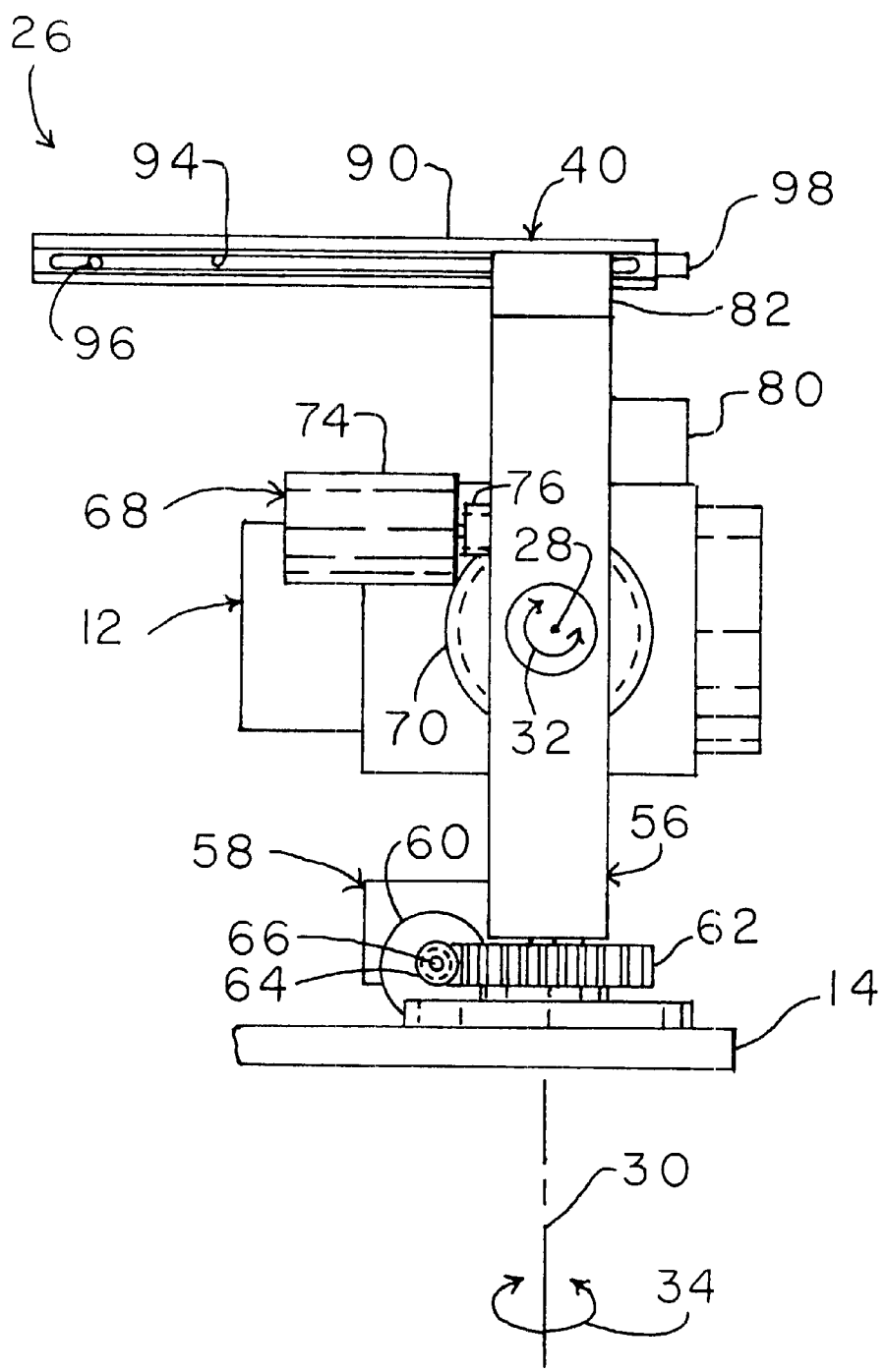
FIG. 5 is an enlarged side view in elevation of the multi-axis scanner support apparatus.

With reference now primarily to FIGS. 4 and 5, the multi-axis scanner support apparatus 26 may comprise a generally rectangularly shaped support frame or gimbal 56 that is pivotally mounted to the base 14 so that the support frame or gimbal 56 may be rotated about pan axis 30. That is, the gimbal 56 may be rotated about the pan axis 30 generally in the directions indicated by arrows 34. The two-dimensional scanner 12 may be mounted within the frame or gimbal 56 by a support shaft 72 so that the two-dimensional scanner 12 may be rotated within the gimbal 56 about a tilt axis 28, i.e., generally in the directions indicated by arrows 32. Consequently, the multi-axis scanner support apparatus 26 allows the two-dimensional scanner to be tilted and panned as necessary about the tilt and pan axes 28 and 30, respectively, to capture an image of the desired object.

The mounting system 10 may also be provided with a gimbal actuator assembly 58 and a scanner actuator assembly 68. The gimbal actuator assembly 58 is used to rotate the gimbal or frame 56 about the pan axis 30, whereas the scanner actuator assembly 68 is used to rotate the two-dimensional scanner 12 about the tilt axis 28.

The gimbal actuator assembly 58 is best seen in FIG. 5 and may comprise an electric motor 60 that is fixedly mounted to the gimbal 56. A worm gear 62 is mounted adjacent the gimbal 56 so that worm gear 62 is concentric with the pan axis 30 and so that worm gear 62 remains fixed with respect to the base 14. That is, the worm gear 62 is free to rotate with respect to the gimbal 56. A worm 64 mounted to the output shaft 66 of motor 60 operatively engages the worm gear 62 and allows the motor 60 to rotate the gimbal 56 about the pan axis 30. Alternatively, other mounting arrangements could be used as would be obvious to persons having ordinary skill in the art after having become familiar with the teachings of the present invention. For example, the motor 60 instead could be fixedly mounted to the base 14 and the worm gear 62 fixedly mounted to the gimbal 56. Such an arrangement would still allow the motor 60 to rotate the gimbal 56 about the pan axis 30, except with this arrangement, the motor 60 would not rotate with the gimbal 56.

Regardless of the particular configuration of the gimbal actuator 58, the gimbal actuator 58 may be provided with a suitable position sensor (not shown), such as an optical encoder or a potentiometer, to allow the control system 11 (FIG. 1) associated with the multi-axis scanner support apparatus 26 to determine the rotational position of the gimbal 58 with respect to the base 14. However, since such position sensors are well-known in the art and could be easily provided by persons having ordinary skill in the art after having become familiar with the present invention, the particular position sensing system utilized in one preferred embodiment of the invention will not be described in further detail herein.

The scanner actuator system 68 may be similar to the gimbal actuator system 58 just described and may comprise a worm gear 70 mounted to the support shaft 72 so that the worm gear 70 is concentric with the tilt axis 28 and so that the worm gear 70 is fixed with respect to the support shaft 72 and gimbal 56. That is, the worm gear 70 is rotatable with respect to the two-dimensional scanner 12. A motor 74 is fixedly mounted to the scanner 12 so that a worm 76 provided on the output shaft 78 of motor 74 engages the worm gear 70. Accordingly, when the motor 74 is operated, the rotating worm 76 causes the motor 74 and scanner 12 to rotate within the gimbal 56 about tilt axis 28, i.e., generally in the directions indicated by arrows 32.

Other arrangements are possible for the scanner actuator system 68. For example, in an alternative arrangement, the motor 74 may be fixedly mounted to the gimbal 56, in which case the worm gear 70 should be fixedly mounted to the two-dimensional scanner 12. Such an arrangement still would allow the motor 74 to rotate the scanner 12 about the tilt axis 28, but without the motor 74 rotating with the scanner 12.

Still yet other arrangements are possible for both the gimbal and scanner actuator systems 58 and 68 described above. For example, the worm gear transmission systems used in both the gimbal and scanner actuator systems 58 and 68 could be replaced with spur-gear transmission systems. In another arrangement, the gear type transmission systems could be eliminated altogether and replaced with belt and sprocket transmission systems. Still yet another arrangement could eliminate the transmission systems altogether, replacing them with direct drive motor systems.

As was the case for the gimbal actuator system 58, the scanner actuator system 68 may be provided with a suitable position sensor (not shown), such as an optical encoder or potentiometer, to allow the control system 11 (FIG. 1) associated with the multi-axis scanner support apparatus 26 to determine the rotational position of the scanner 12 with respect to the gimbal 58. However, since such position sensors are well-known in the art and could be easily provided by persons having ordinary skill in the art after having become familiar with the present invention, the particular position sensing system utilized in one preferred embodiment of the invention to sense the rotational position of the scanner 12 will not be described in further detail herein.

The various components of the gimbal and scanner actuator systems 58 and 68 may comprise any of a wide range of components that are well-known in the art and suitable for the intended application. Consequently, the present invention should not be regarded as limited to any particular component or combinations of components. However, by way of example, in one preferred embodiment, the gimbal 56 is fabricated from aluminum, although other materials may be used. The various motors 60 and 74 may comprise conventional permanent magnet d.c. motors of the type that are readily commercially available. The worm gears 62 and 70, as well as the various worms 64 and 76 may be made from either metal or plastic, again depending on the intended application. In the embodiment shown and described herein, the various gears (i.e., worm gears 62, 70 and worms 64, 76) are molded from a polycarbonate plastic material.

As was briefly mentioned above, the two-dimensional scanner 12 may comprise any of a wide range of two-dimensional scanner systems that are well-known in the art or that may be developed in the future. Consequently, the present invention should not be regarded as limited to any particular type or style of two-dimensional scanner system 12. As was also mentioned above, the various ancillary devices (e.g., scanner control and image data processing systems), as well as the image data processing methods, that may be associated with such two-dimensional cameras are also well-known in the art and could be easily provided by persons having ordinary skill in the art after having become familiar with the teachings of the present invention. Consequently, the particular scanner device, ancillary components, and image data processing methods that are utilized by the scanner 12 in one preferred embodiment of the present invention will not be described in further detail herein.

It is generally preferred, but not required, that the two-dimensional scanner system 12 be provided with an illumination system 80 which may be energized (i.e., turned on) to provide additional illumination to the object being imaged. Here again, since such illumination systems are well-known in the art and could be easily provided by persons having ordinary skill in the art after having become familiar with the teachings of the present invention, the illumination system 80 utilized in one preferred embodiment of the invention will not be described in further detail herein.

The mounting system 10 may also be provided with a mirror assembly 40 to allow the two-dimensional scanner 12 to detect image light (not shown) reflected by an object or document 36' positioned on a horizontal surface 46 immediately in front of the display device 18. In the embodiment shown and described herein, the mirror assembly 40 may comprise a pair of guide members 82 and 84 that are fixedly attached to either side 86, 88 of the gimbal assembly 56. A pair of sliding rails 90 and 92 are sized to slidably engage the guide members 82 and 84 so that the rails may be moved between a retracted position 43 and an extended position 45 (FIG. 2). Each rail 90 and 92 may be provided with an elongate slot 94 therein (FIG. 5) that is sized to slidably receive a pin 96 mounted to a plane mirror 98. The arrangement is such that when the rails 90, 92 are moved to the extended position 45, the mirror 98 may extended outwardly and tilted downwardly (as shown in FIG. 1) to allow image light (not shown) reflected by an object or document 36' positioned on the horizontal surface 46 to be captured by the two-dimensional scanner 12.

The various components of the mirror assembly 40 may be made from any of a wide range of materials, such as metals or plastics, suitable for the intended application. Consequently, the present invention should not be regarded as limited to any particular materials. However, by way of example, in one preferred embodiment, both the guide members 82 and 84, as well as the sliding rails 90 and 92 are molded from a plastic material, such as Delrin®, although other materials may also be used. The plane mirror 98 may comprise a plastic substrate on which is a applied a suitable reflective coating. Alternatively, the substrate of the plane mirror 98 could comprise glass. However, since the choice of materials for the various components of the mirror assembly 40 would be obvious to persons having ordinary skill in the art after having become familiar with the teachings of the present invention, the mirror assembly 40 utilized in one preferred embodiment of the present invention will not be described in further detail herein.

Referring back now to FIG. 1, the operation of the various actuators (e.g., the gimbal and scanner actuators 58 and 68), as well as the two-dimensional scanner 12, may be controlled by a control system 11. For example, in the embodiment shown and described herein, the control system 11 controls the operation of the gimbal and scanner actuator systems 58 and 68 to pan and tilt the two-dimensional scanner 12 to the appropriate positions to accomplish operation in the various modes (e.g, the video conference mode, snap-shot mode, or the document scan mode). The control system 11 may be provided with a joystick assembly 15 to allow the system operator (not shown) to manually pan and tilt the scanner 12 to the appropriate position. Feedback information provided by the gimbal and scanner position sensors (not shown) associated with the gimbal and scanner actuator systems 58 and 68 may then be used by the control system 11 to determine whether the two-dimensional scanner 12 should be operated in the video conference mode, the snap-shot mode, or the document scan mode. Alternatively, the desired scanner operational mode could be manually selected by the user via an icon provided on the display device 18. The scanner 12 may then be either manually or automatically re-oriented to the appropriate position via the joystick 15 or the control system 11, respectively.

In the embodiment shown and described herein, the control system 11 may be programmed to automatically operate the two-dimensional scanner 12 in the appropriate mode depending on the position of the scanner 12. For example, if the control system 11 detects that the scanner 12 is in the position illustrated in FIGS. 1 and 2, the control system 11 may be automatically operate the two-dimensional scanner 12 in the video conference mode. That is, the control system 11 may operate the two-dimensional scanner 12 in such a way that the scanner 12 generates video image data (not shown). The video image data produced by the scanner 12 may then be processed and transmitted in the conventional manner to accomplish video conferencing.

Figure 3:
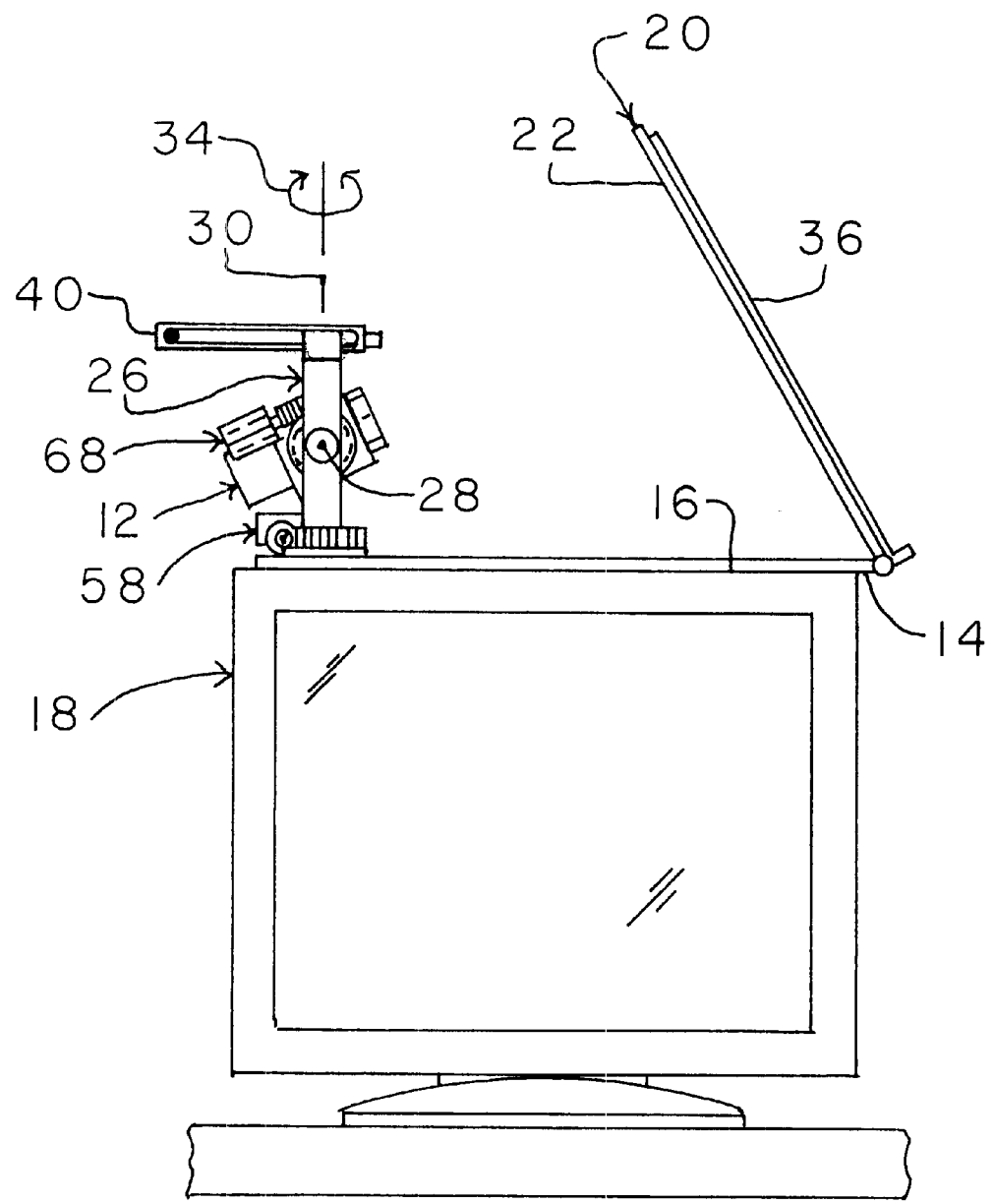
FIG. 3 is a front view in elevation of the mounting system with the two-dimensional scanner in the document scan position.

If, on the other hand, the control system 11 detects that the scanner 12 is located in the position illustrated in FIG. 3, the control system 11 may be programmed to automatically operate the two-dimensional scanner 12 in the document scan mode. When operated in the document scan mode, the control system 11 may activate the lens assembly 17 associated with the scanner 12 to zoom in as required to capture the required detail on the object or document 36 positioned on the platen 20.

The control system 11 utilized in one preferred embodiment of the invention may be configured to automatically operate the scanner 12 to scan a document 36 positioned on the platen 20. For example, the control system 11 may need to automatically zoom the lens assembly 17 so that the image sensor (not shown) associated with the scanner 12 will capture the object in sufficient detail to allow the text or graphics thereon to be satisfactorily discerned. Generally speaking, the control system 11 will zoom the lens 17 to an extent that the document will be scanned at a resolution of about 600 pixels per inch (ppi), although other resolutions are possible. When zoomed to such an extent, the field of view of the scanner 12 will usually be reduced to the point where it can no longer capture an image of the entire document 36. Recognizing this fact, the control system 11 automatically pans and tilts the scanner 12 as necessary to produce a plurality of overlapping image frames sufficient to capture the entire object 36. The image data (not shown) representative of each frame may then be patched or "stitched" together by the control system 11 in order to produce a single, enlarged image frame comprising image data representative of the entirety of the scanned object 36.

If the mounting system 10 is provided with a mirror assembly 40, then the control system 11 may also be programmed to operate the scanner 12 in the second document scan mode in which the scanner 12 is used to capture image data representative of an object 36' positioned on the horizontal surface 46 in front of the display device 18. See FIG. 2. The system operator (not shown) may accomplish operation in this second document scan mode by first moving the scanner 12 to the position illustrated in FIGS. 1 and 2. The system operator may accomplish such movement by operating the joystick 15 as necessary. Alternatively, the control system 11, operating in conjunction with the system operator's personal computer system (not shown) could be instructed to so re-orient the scanner 12 based on user input provided by the personal computer system. For example, the control system 11 may allow the computer system (not shown) to display a suitable icon or symbol on the display device 18 that, when selected by the system operator, will cause the control system 11 to automatically re-orient the scanner 12 to the proper position. Thereafter, the system operator may extend the mirror 98 to allow the scanner 12 to scan the object 36' positioned on the horizontal surface 46. Here again, it may be necessary for the control system 11 to zoom the lens assembly 17 associated with the scanner 12 to provide sufficient resolution of the object 36'. Several snapshots or image frames may be required to be taken, with the control system 11 automatically panning and tilting the scanner 12 as necessary to capture image data representative of the entirety of the object. The various image frames may then be stitched together as necessary to form stitched image data representative of the entirety of the scanned object 36'. Of course, the image data produced by the scanner 12 when using the mirror assembly 40 will be reversed compared with image data produced by the scanner 12 without an intervening mirror. Accordingly, the image data processing software that is operatively associated with the control system 11 may be provided with an image data reversal algorithm (not shown) in order to transpose or reverse the image data. However, since control systems for operating two dimensional scanners and algorithms for reversing image data are known in the art and could be easily provided by persons having ordinary skill in the art after having become familiar with the teachings of the present invention, the particular control system 11 and algorithm for reversing image data that are utilized in one preferred embodiment of the present invention will not be described in further detail herein.

This completes the detailed description of the various embodiments of the mounting system 10 according to the present invention. While a number of specific components were described above for the preferred embodiments of this invention, persons having ordinary skill in the art will readily recognize that other substitute components or combinations of components may be available now or in the future to accomplish functions comparable to those of the apparatus according to the present invention. For example, numerous alternative mounting arrangements and configurations may be provided for the transparent platen 20 associated with the present invention. That is, the transparent platen 20 need not be pivotally mounted to the base 14 but instead could be fixedly mounted to the base 14, in which case the platen 20 could not be folded out of the way when not in use. Alternatively, the platen 20 may be slidably mounted to the side of the display device 18 so that the platen 20 may be moved vertically upward to a position substantially as shown herein when it is desired to scan a document provided thereon. Still other arrangements are possible. For example, the platen 20 could be affixed to the rear portion of either the base 14 or the display device 18 and allowed to extend upward so that it is generally parallel to the plane of the screen of the display device 18. If so, the scanner 12 would need to be rotated approximately 180 degrees about the pan axis 30 in order to scan a document positioned on the platen.

Other possible substitutes have been mentioned throughout this description, and many more equivalents are possible, for example, the platen 20 need not be transparent if it is configured to allow the document 36 to be positioned on the same side as the scanner 12. Likewise, the multi-axis scanner support assembly 26 is not limited to the specific structures and configurations shown and described herein, and several alternative configurations for achieving the same functions would be obvious to persons having ordinary skill in the art after having become familiar with the details of this invention. In still another variation, the two dimensional scanner could be replaced with a one-dimensional scanner or linear scanning CCD. The linear scanning CCD could then be used to capture a two dimensional image of the object by sweeping the scanner over the object in a manner akin to conventional line-type flatbed scanners and the like. Therefore, it would be feasible to someone having ordinary skill in the art, in light of this disclosure, to assemble the necessary components to practice this invention, regardless of whether some of such components are the same as those described herein.

Consequently, the foregoing description should be considered illustrative of the principles of the invention, and all suitable modifications and equivalents that may be resorted to should be considered as falling within the scope of the invention as defined by the claims which follow.

The embodiments of the invention in which an exclusive property or privilege is claimed are defined as follows:

1. A mounting system for a two-dimensional scanner, comprising:
   a base;
   a platen mounted to said base; and
   a multi-axis scanner support apparatus mounted to said base and sized to receive said two-dimensional scanner, said multi-axis scanner support apparatus allowing said two-dimensional scanner to be moved between a first position wherein said two-dimensional scanner receives image light from an object positioned on said platen and a second position wherein said two-dimensional scanner receives image light from an object not positioned on said platen.

2. The mounting system of claim 1, wherein said platen comprises a transparent member and wherein image light from the object placed on said platen passes through the transparent member comprising said platen before being incident on said two-dimensional scanner.

3. The mounting system of claim 2, wherein said platen is mounted to said base so that said platen may be moved between a retracted position and an extended position.

4. The mounting system of claim 1, wherein said multi-axis scanner support apparatus comprises a gimbal pivotally mounted to said base so that said gimbal is rotatable about a first axis, said two dimensional scanner being mounted to said gimbal so that said two dimensional scanner is rotatable within said gimbal about a second axis.

5. The mounting system of claim 4, wherein said second axis is orthogonal to said first axis.

6. The mounting system of claim 4, further comprising:
   a gimbal actuator operatively associated with said gimbal, said gimbal actuator rotating said gimbal about the first axis; and a scanner actuator operatively associated with said scanner, said scanner actuator rotating said two-dimensional scanner within said gimbal about the second axis.

7. The mounting system of claim 6, further comprising a control system operatively associated with said gimbal actuator and said scanner actuator.

8. The mounting system of claim 6, further comprising a mirror operatively associated with said two-dimensional scanner, said mirror allowing said two-dimensional scanner to receive image light from an object that is not aligned with said two-dimensional scanner.

9. A mounting system for a two-dimensional scanner, comprising:

a base;

platen means mounted to said base for allowing an object positioned on said platen means to be imaged by said two-dimensional scanner; and multi-axis scanner support means mounted to said base for supporting said two-dimensional scanner and for allowing said two-dimensional scanner to be moved between a first position wherein said two-dimensional scanner receives image light from an object positioned on said platen means and a second position wherein said two-dimensional scanner receives image light from an object not positioned on said platen means, said multi-axis scanner support means comprising gimbal means for allowing said two-dimensional scanner to be rotated about a first axis and a second axis.

10. The mounting system of claim 9, wherein said second axis is orthogonal to said first axis.

11. The mounting system of claim 9, further comprising gimbal actuator means operatively associated with said gimbal means for rotating said two-dimensional scanner about the first axis and the second axis.

12. The mounting system of claim 11, further comprising control system means operatively associated with said gimbal actuator means for operating said gimbal actuator means to rotate said two-dimensional scanner about the first axis and the second axis.

13. The mounting system of claim 12, further comprising mirror means operatively associated with said two-dimensional scanner for allowing said two-dimensional scanner to receive image light from an object that is not aligned with said two-dimensional scanner.

14. In combination, a display and a two-dimensional scanner, comprising:

a display device having a top surface;

a platen mounted to the top surface of said display device; and a multi-axis scanner support apparatus mounted to the to surface of said display device and sized to receive said two-dimensional scanner so that said two-dimensional scanner can be moved between a first position wherein said two-dimensional scanner receives image light from an object positioned on said platen and a second position wherein said two-dimensional scanner receives image light from an object not positioned on said platen.

15. The combination of claim 14, wherein said platen comprises a transparent member and wherein image light from the object placed on said platen passes through the transparent member comprising said platen before being incident on said two-dimensional scanner.

16. The combination of claim 15, wherein said platen is mounted to the top surface of said display device so that said platen may be moved between a retracted position and an extended position.

17. The combination of claim 16, wherein said multi-axis scanner support apparatus comprises:

a base mounted to the top surface of said display device;

a gimbal pivotally mounted to said base so that said gimbal is rotatable about a first axis, said two dimensional scanner being mounted to said gimbal so that said two dimensional scanner is rotatable within said gimbal about a second axis, said second axis being orthogonal to said first axis.

18. The combination of claim 17, further comprising:

a gimbal actuator operatively associated with said gimbal, said gimbal frame actuator rotating said gimbal about the first axis; and a scanner actuator operatively associated with said two-dimensional scanner, said scanner actuator rotating said two-dimensional scanner about the second axis.

19. A mounting system for a two-dimensional scanner, comprising:

a base;

a platen mounted to said base;

a gimbal pivotally mounted to said base so that said gimbal is rotatable about a first axis, said two dimensional scanner being mounted to said gimbal so that said two dimensional scanner is rotatable within said gimbal about a second axis;

a gimbal actuator operatively associated with said gimbal, said gimbal actuator rotating said gimbal about the first axis; and a scanner actuator operatively associated with said scanner, said scanner actuator rotating said two-dimensional scanner within said gimbal about the second axis.

* * * * *